United States Patent
Toyoshima et al.

(12) 
(10) Patent No.: US 6,685,979 B1
(45) Date of Patent: Feb. 3, 2004

(54) GERMINATED BROWN RICE WITH GOOD SAFETY AND COOKING PROPERTY, PROCESS FOR PRODUCING THE SAME, AND PROCESSED FOOD THEREFROM

(75) Inventors: Hidechika Toyoshima, Ibaraki (JP); Ken'ichi Ohtsubo, Inashiki-gun (JP); Hiroshi Okadome, Tsukuba (JP); Kikuichi Tsukahara, Ueda (JP); Noriko Komatsuzaki, Matsudo (JP); Tetsuya Kohno, Odawara (JP)

(73) Assignees: Domer, Inc., Ueda (JP); National Food Research Institute, Tsukuba (JP); Meiji Dairies Corporation, Tokyo (JP)

( * ) Notice: Subject to any disclaimer, the term of this patent is extended or adjusted under 35 U.S.C. 154(b) by 0 days.

(21) Appl. No.: 09/889,593
(22) PCT Filed: Feb. 2, 2000
(86) PCT No.: PCT/JP00/00575
  § 371 (c)(1),
  (2), (4) Date: Oct. 22, 2001
(87) PCT Pub. No.: WO00/45646
  PCT Pub. Date: Aug. 10, 2000

(30) Foreign Application Priority Data

Feb. 2, 1999 (JP) ............................................. 11-24694

(51) Int. Cl.$^7$ ............................ A23C 9/02; A23C 9/26; A23L 1/182
(52) U.S. Cl. ...................... 426/627; 426/507; 426/508; 426/618
(58) Field of Search ................................ 426/618, 627, 426/507, 508

(56) References Cited

U.S. PATENT DOCUMENTS

| | | | |
|---|---|---|---|
| 5,316,783 A | * 5/1994 | Kratochivil et al. | ......... 426/627 |
| 5,738,892 A | 4/1998 | Takaoka | |
| 5,972,413 A | * 10/1999 | Whitney et al. | ............. 426/618 |
| 2002/0031596 A1 | * 3/2002 | Aoto et al. | .................. 426/618 |

FOREIGN PATENT DOCUMENTS

| | | | | |
|---|---|---|---|---|
| JP | 6 0234556 | * | 11/1985 | ................. 426/627 |
| JP | 61-257146 | | 11/1986 | |
| JP | 6 2143656 | * | 6/1987 | ................. 426/627 |
| JP | 4-4851 | | 1/1992 | |
| JP | 11-4661 | | 1/1999 | |
| JP | 411266805 A | * | 10/1999 | |
| JP | 02000157192 A | * | 7/2000 | |

* cited by examiner

*Primary Examiner*—Helen Pratt
(74) *Attorney, Agent, or Firm*—Oblon, Spivak, McClelland, Maier & Neustadt, P.C.

(57) ABSTRACT

The invention relates to: germinated brown rice having a degree of starch gelatinization of from 30 to 90%, a water content of from 20 to 70%, an α-amylase activity of not greater than 5 IU/g, and a population of attached microorganisms of not greater than 10,000/g, which has good safety and low contamination by microorganisms and little or no fermentation odor or other unpleasant odors; a process for producing the per-germinated brown rice, comprising treating the germinated brown rice with hot water or steam; and a processed food prepared by processing the germinated brown rice.

20 Claims, No Drawings

GERMINATED BROWN RICE WITH GOOD SAFETY AND COOKING PROPERTY, PROCESS FOR PRODUCING THE SAME, AND PROCESSED FOOD THEREFROM

FIELD OF THE INVENTION

The present invention relates to germinated brown rice having good safety and cooking properties, a process for producing the same, and a processed food prepared therefrom.

DESCRIPTION OF RELATED ART

Brown rice (i.e., unpolished or unmilled rice) is highly nutritious compared to white rice (i.e., polished or milled rice). Brown rice contains most of the nutrients necessary for a living human body, particularly rich in dietary fibers, B vitamins and vitamin E whose physiological functions have recently become the focus of attention.

Although brown rice is an excellent food material as mentioned above, its surface is surrounded by a tough outer layer rich in oils and fibrous ingredients, which prevents penetration of heat and absorption of water upon cooking under ambient pressure, resulting in insufficient starch gelatinization and insufficient softening/decomposition of the outer layer tissue.

Therefore, brown rice cooked under ambient pressure is harder and less sticky and has a poorer eating quality (i.e., palatability) compared to cooked white rice.

In order to overcome these disadvantages, brown rice has been cooked under pressure. However, in the cooking under pressure, a part of high temperature/high pressure-sensitive nutrients in brown rice (e.g., vitamins) is decomposed. Moreover, when brown rice is heated until its outer layer becomes sufficiently soft, the region other than the outer layer becomes mushy due to gelatinization of starch. Therefore, it is almost impossible to cook brown rice into cooked rice that is smooth to eat and has good digestion/absorption properties.

It is known that brown rice may be immersed in warmed water of 5–50° C., preferably 20–40° C., for an appropriate period of time to cause the germination of the brown rice and the germinated brown rice may then be boiled or steamed under ambient pressure, whereby softly cooked brown rice can be prepared.

As used herein, the term "germination" or "germinating" means that brown rice is germinated to such an extent that a bud is grown from the embryo, and preferably a bud of about 0.5 to about 1 mm can be observed by the naked eye. This term also encompasses the state of brown rice where no bud is observed but the embryo is expanded, namely "pre-germination" state.

When brown rice is germinated in this manner, however, it changes into a fermented state during the germination process by the metabolic action of the brown rice itself or due to the proliferation of undesirable microorganisms on the outer surface of the brown rice or in water into which the brown rice is immersed. As a result, a fermentation odor or other unpleasant odor is generated and remains in the germinated brown rice after the heat treatment.

Moreover, in such germinated brown rice, there is also a problem that the decomposition of starch or the like progresses excessively by the action of the endogenous enzymes with the passage of time, resulting in deterioration in quality as a food material.

In order to overcome the above-mentioned disadvantages, many methods have been proposed, in which brown rice is germinated in hot water containing a bactericidal agent or in a dilute electrolytic saline, germinated in running water, or germinated in hot water while replacing the water with fresh water at regular intervals.

However, when employing a chemical, there is the concern over the influence of residual chemical on the germinated brown rice or a chemical odor remaining on the germinated brown rice; while in the case of a method utilizing hot water that is replaced with fresh water at regular intervals or a method utilizing running water, the production process is water- and energy-wasting and is complicate to control.

SUMMARY OF THE INVENTION

An object of the present invention is to provide germinated brown rice safely, with a low contamination by microorganisms and without fermentation odor or any other unpleasant odors. Another object of the present invention is to provide a process for producing germinated brown rice efficiently. Still another object of the present invention is to provide a processed food prepared from the germinated brown rice which is good to the taste and highly nutritious.

The present inventors have studied for achieving the aforementioned objects. As a result, the inventors have found that germinated brown rice capable of being processed into soft, sticky and highly nutritious cooked brown rice can be produced by treating germinated brown rice with hot water or steam. This finding led to the accomplishment of the present invention.

According to the first aspect of the present invention, there is provided germinated brown rice having a degree of starch gelatinization of from 30 to 90%, a water content of from 20 to 70%, an $\alpha$-amylase activity of not greater than 5 IU/g, and a population of attached microorganisms of not greater than 10,000/g.

According to the second aspect of the present invention, there is provided germinated brown rice having a degree of starch gelatinization of from 30 to 90%, a water content of from 20 to 70%, an $\alpha$-amylase activity of not greater than 2 IU/g, a population of attached microorganisms of not greater than 1,000/g, and an ethyl alcohol content of from 0.5 to 20%.

According to the third aspect of the present invention, there is provided a process for producing the germinated brown rice according to the first aspect of the present invention, comprising treating germinated brown rice with hot water or steam.

According to the fourth aspect of the present invention, there is provided a process for producing the germinated brown rice according to the second aspect of the present invention, comprising treating germinated brown rice with hot water or steam, and then adding ethyl alcohol to the treated germinated brown rice.

In the third or fourth aspect of the present invention, the treatment of the germinated brown rice with hot water may be performed by immersing the germinated brown rice in hot water of 60 to 100° C. for 5 to 30 minutes.

In the third or fourth aspect of the present invention, the treatment of the germinated brown rice with steam may be performed by steaming with steam of 0.5 to 1.5 kg/cm$^2$ for 5 to 30 minutes.

According to the fifth aspect of the present invention, there is provided a processed food prepared by processing the germinated brown rice according to the first or second aspect of the present invention.

This specification includes part or all of the contents as disclosed in the specification of Japanese Patent Application No.24694/1999, which is a priority document of the present application and incorporated herein by reference in its entirety.

The above and other objects, effects, features and advantages of the present invention will become more apparent from the following description of embodiments thereof.

DETAILED DESCRIPTION OF THE INVENTION

The present invention is described in detail in the following.

The germinated brown rice according to one aspect of the present invention has characteristics of a degree of starch gelatinization of from 30 to 90%, a water content of from 20 to 70%, an α-amylase activity of not greater than 5 IU/g, and a population of attached microorganisms of not greater than 10,000/g. The germinated brown rice preferably has characteristics of a degree of starch gelatinization of from 50 to 85%, a water content of from 25 to 40%, an α-amylase activity of not greater than 2 IU/g and a population of attached microorganisms of not greater than 500/g. The microorganisms attached onto the germinated brown rice include general bacteria (e.g., *Escherichia coli, Bacillus subtilis*), ray fungus (e.g., Streptomyces) and fungi (e.g., Penicillium).

The germinated brown rice according to another aspect of the present invention has characteristics of a degree of starch gelatinization of from 30 to 90%, a water content of from 20 to 70%, an α-amylase activity of not greater than 2 IU/g, a population of attached microorganisms of not greater than 1,000/g, and an ethyl alcohol content of from 0.5 to 20%.

The germinated brown rice may be prepared by treating brown rice that has been germinated in a conventional manner, with hot water or steam.

The treatment of germinated brown rice with hot water may be performed by immersing the germinated brown rice in hot water of 60 to 100° C., preferably 90 to 100° C., for 5 to 30 minutes, preferably for 5 to 10 minutes.

In the treatment with hot water, if the temperature of the hot water used is lower than 60° C. or the time of immersing the germinated brown rice in hot water is shorter than 5 minutes, then the deactivation of endogenous enzymes is insufficient and the satisfactory reduction in population of attached microorganisms cannot be achieved.

If the temperature of the hot water is too high or the time of immersing the germinated brown rice in hot water is too long, although the population of attached microorganisms can be reduced satisfactorily, the gelatinization of starch progresses excessively and, as a result, the shape of the germinated brown rice cannot be retained and the stickiness of the surface layer of the germinated brown rice becomes too high. Therefore, these conditions are not preferable.

The treatment of germinated brown rice with steam may be performed by treating the germinated brown rice with steam of 0.5 to 1.5 kg/cm² generated with a boiler or the like for 5 to 30 minutes, preferably for 10 to 20 minutes.

In the treatment with steam, if the time of treatment is too short, then the satisfactory reduction in population of attached microorganisms cannot be achieved, whereas if the time is too long, then the shape of the germinated brown rice cannot be retained and the stickiness of the germinated brown rice becomes too high. Therefore, these conditions are not also preferable.

The germinated brown rice containing ethyl alcohol may be prepared by treating germinated brown rice with hot water or steam and then adding ethyl alcohol thereto. The ethyl alcohol may be absolute or aqueous ethyl alcohol. The ethyl alcohol may be added to the germinated brown rice in an appropriate amount by spraying or the like, thereby to cause the absorption of ethyl alcohol by the germinated brown rice.

The processed food prepared from the germinated brown rice of the present invention includes, for example, rice snacks (e.g., rice crackers), breads, noodles or pastas (e.g., bean threads). These food products can be produced by adding an appropriate amount of the per-germinated brown rice in the corresponding production processes.

The germinated brown rice of the present invention undergoes less degradation in quality caused by the proliferation of microorganisms during the distribution process of the germinated brown rice. The germinated brown rice can be cooked readily under ordinary pressure, thereby producing cooked brown rice that is soft, sticky, good to the taste and rich in nutrients.

In contrast, germinated brown rice without treatment with hot water or steam as described above is metabolically active and, as a result, exhibits high activities of hydrolases such as α-amylase. In such germinated brown rice, starch and proteins are decomposed and plumules and radicles grow excessively with the passage of time, and therefore such germinated brown rice becomes unsuitable to eat.

Hereinbelow, the present invention will be illustrated in more detail with reference to the following examples. It should be understood, however, that the invention is not limited to the examples.

EXAMPLES

Example 1

Brown rice (a product in Japan) previously washed with water was immersed in water, and then maintained at 35° C. for 24 hours to cause germination of the brown rice. The germinated brown rice was treated with steam of 1.2 kg/cm² for a predetermined period of time within 10 to 120 minutes using a continuous rice steamer (WK-RSI model, manufactured by Watanabe Kogyo, Japan). Optionally, the treated germinated brown rice was then immersed in 70% or 100% ethyl alcohol for 3 to 5 minutes. These procedures were performed in a sterile room.

The resultant germinated brown rice was packaged into a suitable container, and then stored at 5° C.

The conditions for production of the samples are shown in Table 1.

For comparison, brown rice without germination and brown rice without steaming were also tested.

TABLE 1

| No. | Germination | Time of steaming (min.) | Immersion in ethanol | Concentration of ethanol (%) | Time of immersing in ethanol (min.) | Note |
|---|---|---|---|---|---|---|
| 1 | No | 0 | No | | | Comparative |
| 2 | Yes | 0 | No | | | Comparative |
| 3 | Yes | 2 | No | | | Comparative |

TABLE 1-continued

| No. | Germination | Time of steaming (min.) | Immersion in ethanol | Concentration of ethanol (%) | Time of immersing in ethanol (min.) | Note |
|---|---|---|---|---|---|---|
| 4 | Yes | 10 | No | | | This invention |
| 5 | Yes | 20 | No | | | This invention |
| 6 | Yes | 30 | No | | | This invention |
| 7 | Yes | 10 | Yes | 70 | 3 | This invention |
| 8 | Yes | 10 | Yes | 70 | 5 | This invention |
| 9 | Yes | 10 | Yes | 100 | 3 | This invention |
| 10 | Yes | 10 | Yes | 100 | 5 | This invention |
| 11 | Yes | 20 | Yes | 70 | 3 | This invention |
| 12 | Yes | 30 | Yes | 70 | 5 | This invention |
| 13 | Yes | 60 | No | | | This invention |
| 14 | Yes | 120 | No | | | Comparative |

The samples produced were determined for bacteria population (by the agar medium method) and, after cooking, a physical property (using a Tensipresser), the content of an amino acid (using an automated amino acid analyzer), the degree of starch gelatinization (by the β-amylase/pullulanase method), the viscosity in a gelatinized form (using Rapid-Visco-Analyser, RVA), the α-amylase activity (using Test Wako Kit B) and the water content were also determined. The results are shown in Table 2. In Table 2, the "overall assessment" was determined by averaging the opinions of 20 panelists, where "◎" means "very good", ○ means "good", and "X" means "poor".

TABLE 2

| No. | Population of bacteria (bacteria/g) | Water content (%) | Degree of gelatinization (%) | α-Amylase activity (IU) | γ-Amino butyric acid (mg) | Hardness of cooked rice grain (kgf) | Overall assessment |
|---|---|---|---|---|---|---|---|
| 1 | $1.0 \times 10^7$ | 13.4 | 0 | 1.34 | 1.3 | 5.76 | x |
| 2 | $1.9 \times 10^7$ | 36.2 | 0 | 2.70 | 9.6 | 4.23 | x |
| 3 | $1.1 \times 10^7$ | 36.0 | 23.1 | 2.24 | 9.3 | 3.94 | x |
| 4 | 0 | 36.1 | 53.8 | 0.38 | 9.2 | 3.20 | ○ |
| 5 | 0 | 37.0 | 77.6 | 0.33 | 10.1 | 3.89 | ○ |
| 6 | 0 | 37.6 | 82.3 | 0.50 | 9.8 | 3.74 | ○ |
| 7 | 0 | 39.6 | 53.2 | 0.12 | 8.0 | 3.55 | ○ |
| 8 | 0 | 38.5 | 52.8 | 0.10 | 9.2 | 3.04 | ◎ |
| 9 | 0 | 36.9 | 55.6 | 0.02 | 9.6 | 3.27 | ◎ |
| 10 | 0 | 37.3 | 54.8 | 0.03 | 9.4 | 3.51 | ◎ |
| 11 | 0 | 37.7 | 79.5 | 0.05 | 9.1 | 4.39 | ○ |
| 12 | 0 | 38.9 | 84.3 | 0.03 | 8.8 | 3.69 | ○ |
| 13 | 0 | 40.0 | 86.9 | 0.15 | 8.5 | 3.62 | ○ |
| 14 | 0 | 39.2 | 94.1 | 0.15 | 6.4 | 4.11 | x |

As shown in Table 2, samples No.1–No.3 were unsuitable, since they had large populations of attached microorganisms. Particularly, sample No.3 was not gelantinized satisfactory and, when cooked, the rice grain was hard, the reduction in α-amylase activity was insufficient, and the surface layer of the rice grain was too sticky. Sample No.14 was also unsuitable, since the degree of starch gelatinization was high and only the surface layer of the rice grain was too sticky and, when cooked, the rice grain was hard and the content of γ-amino butyric acid was decreased due to excessive steaming.

In contrast, samples No.4–No.13 were suitable and good in quality, since they had small populations of attached microorganisms, the degrees of gelatinization fell within an appropriate range and the γ-amino butyric acid content was high and, when cooked, they were soft and exhibited reduced α-amylase activities.

Example 2

Brown rice ("Hokkai #269") that was previously washed with water was immersed in water, and maintained at 35° C. for 24 hours to cause germination of the brown rice. The germinated brown rice was treated with steam of 1.2 kg/cm² for a predetermined period of time within 10 to 30 minutes using a continuous rice steamer (WK-RSI model, manufactured by Watanabe Kogyo, Japan). Optionally, the treated germinated brown rice was then immersed in 70% or 100% ethyl alcohol for 3 to 5 minutes. These procedures were performed in an open system.

The resultant germinated brown rice was packaged into a suitable container, and then stored at 5° C.

The conditions for production of the samples are shown in Table 3.

For comparison, brown rice without germination and brown rice without steaming were also tested.

TABLE 3

| No. | Germination | Time of steaming (min.) | Immersion in ethanol | Concentration of ethanol (%) | Time of immersing in ethanol (min.) | Note |
|---|---|---|---|---|---|---|
| 1 | No | 0 | No | — | — | Comparative |
| 2 | Yes | 0 | No | — | — | Comparative |
| 3 | Yes | 2 | No | — | — | Comparative |
| 4 | Yes | 10 | No | — | — | This invention |

TABLE 3-continued

| No. | Germination | Time of steaming (min.) | Immersion in ethanol | Concentration of ethanol (%) | Time of immersing in ethanol (min.) | Note |
|---|---|---|---|---|---|---|
| 5 | Yes | 20 | No | — | — | This invention |
| 6 | Yes | 30 | No | — | — | This invention |
| 7 | Yes | 10 | Yes | 70 | 3 | This invention |
| 8 | Yes | 10 | Yes | 70 | 5 | This invention |
| 9 | Yes | 10 | Yes | 100 | 3 | This invention |
| 10 | Yes | 10 | Yes | 100 | 5 | This invention |
| 11 | Yes | 20 | Yes | 70 | 3 | This invention |
| 12 | Yes | 30 | Yes | 70 | 5 | This invention |

The samples produced were determined for bacteria population (by the agar medium method) and, after cooking, a physical property (using a Tensipresser) and the content of an amino acid (using an automated amino acid analyzer) were also determined. The results are shown in Table 4. In Table 4, the "overall assessment" was determined by averaging the opinions of 20 panelists, where "◎" means "very good", o means "good", and "X" means "poor".

TABLE 4

| No. | Population of bacteria (bacteria/g) | Water content (%) | γ-Amino butyric acid (mg) | Hardness of cooked rice grain (kgf) | Overall assessment |
|---|---|---|---|---|---|
| 1 | 1.0 × 10⁷ | 14.9 | 2.9 | 7.87 | X |
| 2 | 3.2 × 10⁵ | 38.6 | 24.5 | 3.10 | X |
| 3 | 3.8 × 10⁵ | 38.3 | 19.2 | 3.32 | X |
| 4 | 6.7 × 10⁵ | 38.2 | 16.0 | 3.46 | X |
| 5 | 2.7 × 10³ | 39.3 | 16.2 | 3.65 | ○ |
| 6 | 3.6 × 10³ | 39.2 | 15.9 | 3.53 | ○ |
| 7 | 4.5 × 10² | 40.6 | 14.3 | 3.06 | ○ |
| 8 | 0 | 40.0 | 14.4 | 3.31 | ◎ |
| 9 | 0 | 37.2 | 15.0 | 3.38 | ◎ |
| 10 | 0 | 37.0 | 14.9 | 3.28 | ◎ |
| 11 | 0 | 41.1 | 15.2 | 3.24 | ◎ |
| 12 | 0 | 41.0 | 15.0 | 3.58 | ◎ |

As shown in Table 4, samples No.1–No.4 were unsuitable, since they had large populations of microorganisms due to insufficient steaming. In contrast, samples No.5–No.12 were good in quality and suitable, since they had small populations of microorganisms and high γ-amino butyric acid contents and, when cooked, they were soft.

Example 3

Brown glutinous rice (unpolished mochigome; "Mochiminori") previously washed with water was immersed in water, and then maintained at 35° C. for 24 hours to cause germination of the brown glutinous rice. The germinated brown glutinous rice was treated with steam of 1.2 kg/cm² for a predetermined period of time within 10 to 120 minutes using a continuous rice steamer (WK-RSI model, manufactured by Watanabe Kogyo, Japan). These procedures were performed in a sterile room.

The resultant germinated brown glutinous rice was stored at 5° C.

The conditions for production of the samples are shown in Table 5.

For comparison, brown rice without germination and brown rice without steaming were also tested.

TABLE 5

| No. | Germination | Time of steaming (min.) | Low-temperature storage (at 5° C.) | Note |
|---|---|---|---|---|
| 1 | No | 0 | No | Comparative |
| 2 | Yes | 0 | No | Comparative |
| 3 | Yes | 2 | Yes | Comparative |
| 4 | Yes | 10 | Yes | This invention |
| 5 | Yes | 20 | Yes | This invention |
| 6 | Yes | 30 | Yes | This invention |
| 7 | Yes | 60 | Yes | This invention |
| 8 | Yes | 120 | Yes | Comparative |

The samples produced were determined for bacteria population (by the agar medium method) and, after cooking, a physical property (using a Tensipresser), the content of an amino acid (using an automated amino acid analyzer), the degree of starch gelatinization (by the β-amylase/pullulanase method), the viscosity in a gelatinized form (using Rapid-Visco-Analyser, RVA), the α-amylase activity (using Test Wako Kit B) and the water content were also determined. The results are shown in Table 6. In Table 6, the "overall assessment" was determined by averaging the opinions of 20 panelists, where ◎ means "good", "Δ" means "relatively good", and "X" means "poor".

TABLE 6

| No. | Population of bacteria (bacteria/g) | Water content (%) | Degree of gelatinization (%) | α-Amylase activity (IU) | γ-Amino butyric acid (mg) | Hardness of cooked rice grain (kgf) | Overall assessment |
|---|---|---|---|---|---|---|---|
| 1 | 1.0 × 10⁷ | 14.2 | 0 | 5.2 | 1.7 | 4.33 | x |
| 2 | 1.9 × 10⁷ | 36.5 | 0 | 12.5 | 13.6 | 3.13 | x |
| 3 | 1.1 × 10⁷ | 36.3 | 28.6 | 6.7 | 11.8 | 3.24 | x |
| 4 | 0 | 36.5 | 58.8 | 3.2 | 10.6 | 3.20 | Δ |
| 5 | 0 | 36.8 | 79.3 | 1.8 | 10.3 | 3.49 | ○ |
| 6 | 0 | 37.9 | 83.5 | 0.5 | 9.3 | 3.52 | ○ |
| 7 | 0 | 38.7 | 88.6 | 0.2 | 9.1 | 3.77 | ○ |
| 8 | 0 | 39.6 | 93.2 | 0.2 | 7.8 | 4.15 | x |

As shown in Table 6, samples No.1 and No.2 were unsuitable, since they had populations of microorganisms larger than 10,000/g due to no steaming. Sample No.3 was also unsuitable, since it had a large population of attached microorganisms due to insufficient steaming, required a prolonged cooking time due to its low degree of starch gelatinization and, after cooked, the surface layer of the rice grain was too sticky due to insufficient α-amylase deactivation. Samples No.1–No.3 were unsatisfactory in quality for cooking, since one week after the preparation, the starch and other cellular materials were decomposed by endogenous enzymes such as amylase.

In contrast, samples No.4–No.7 retained quality even after one week, since the endogenous enzymes had been deactivated by steaming. In sample No. 4, although the degree of starch gelatinization was slightly low and the deactivation of α-amylase was insufficient, these properties were remarkably improved as compared with sample No.3. Therefore, sample No.4 was relatively good in quality from the overall viewpoint.

Sample No.8, however, was unsuitable, since the degree of starch gelatinization was large and the surface layer was too sticky due to excessive steaming and, after cooked, the rice grain became hard and the γ-amino butyric acid content was reduced.

Samples No.5–No.7 were of good quality, since they had small populations of attached microorganisms, the degrees of starch gelatinization fell within an appropriate range and the γ-amino butyric acid content was high and, after cooked, they were soft and exhibited reduced α-amylase activity.

As described above, the germinated brown rice of the present invention can be produced by treating brown rice that has been germinated by a conventional manner, with hot water or steam. The germinated brown rice has characteristics of a low population of general microorganisms attached, a degree of starch gelatinization falling within an appropriate range and a low α-amylase activity. The germinated brown rice of the present invention has no unpleasant fermentation odor or any other unpleasant odor or acridity and exhibits a good eating quality. The germinated brown rice of the present invention is stable in quality and, therefore, its appearance is hardly impaired during storage.

Therefore, when eaten as cooked brown rice, the germinated brown rice of the present invention can be cooked readily and rapidly using a conventional rice cooker without the need for swelling with water over a long period of time or the need to use a pressure cooker.

The cooked germinated brown rice is free from the fear of food poisoning, is soft and good to eat, and is excellent from a nutritional standpoint.

The germinated brown rice of the present invention is stable in quality after it is produced. If germinated brown rice of more stable quality is desired, the germinated brown rice may be further treated so that it contains an appropriate amount of ethyl alcohol, whereby the population of microorganisms attached thereon can be more reduced and the endogenous enzymes such as α-amylase can be deactivated more effectively. In the ethyl alcohol-treated germinated brown rice, therefore, the increase in population of attached microorganisms during distribution can be inhibited efficiently, and the metabolic action can be abolished.

What is claimed is:

1. Germinated brown rice having a degree of starch gelatinization of from 30 to 90%, a water content of from 20 to 70%, and α-amylase activity of not greater than 5 IU/g, and a population of attached microorganisms of not greater than 10,000/g.

2. The germinated brown rice of claim 1, which has a γ-amino butyric acid content ranging from 8.5 to 16.2 mg/g.

3. The germinated brown rice of claim 1, which when cooked, has a degree of hardness (kgf) ranging from 3.20 to 3.89.

4. The germinated brown rice of claim 1, which is brown glutinous rice.

5. The germinated brown rice of claim 1, which is not brown glutinous rice.

6. A processed food comprising the germinated brown rice of claim 1.

7. A processed food comprising the germinated brown rice of claim 1 which is selected from the group consisting of a rice snack, rice cracker, bread, noodle, and pasta.

8. A process for producing the germinated brown rice of claim 1, comprising germinating brown rice and treating the germinated brown rice with hot water or steam for a time and under conditions suitable for production of germinated brown rice having a degree of starch gelatinization of from 30 to 90%, a water content of from 20 to 70%, and α-amylase activity of not greater than 5 IU/g, and a population of attached microorganisms of not greater than 10,000/g.

9. A process for producing the germinated brown rice of claim 1, comprising treating the germinated brown rice with hot water by immersing the germinated brown rice in hot water of 60° C. to 100° C. for 5 to 30 minutes.

10. A process for producing the germinated brown rice of claim 1, comprising treating the germinated brown rice with steam of 0.5 to 1.5 kg/cm$^2$ for 5 to 30 minutes.

11. Germinated brown rice having a degree of starch gelatinization of from 30 to 90%, a water content of from 20 to 70%, and α-amylase activity of not greater than 2 IU/g, a population of attached microorganisms of not greater than 1,000/g, and an ethyl alcohol content of from 0.5 to 20%.

12. The germinated brown rice of claim 11, which has a γ-amino butyric acid content ranging from 8.0 to 15.2 mg/g.

13. The germinated brown rice of claim 11, which when cooked, has a degree of hardness (kgf) ranging from 3.04 to 4.39.

14. The germinated brown rice of claim 11, which is brown glutinous rice.

15. The germinated brown rice of claim 11, which is not brown glutinous rice.

16. A processed food comprising the germinated brown rice of claim 11.

17. A processed food comprising the germinated brown rice of claim 11 which is selected from the group consisting of a rice snack, rice cracker, bread, noodle, and pasta.

18. A process for producing the germinated brown rice of claim 11, comprising germinating brown rice, treating the germinated brown rice with hot water or steam, and then adding absolute or aqueous ethanol for a time and under conditions suitable for production of germinated brown rice having a degree of starch gelatinization of from 30 to 90%, a water content of from 20 to 70%, and α-amylase activity of not greater than 2 IU/g, a population of attached microorganisms of not greater than 1,000/g and an ethanol content of 0.5 to 20%.

19. A process for producing the germinated brown rice of claim 11, comprising treating the germinated brown rice with steam of 0.5 to 1.5 kg/cm$^2$ for 5 to 30 minutes.

20. A process for producing the germinated brown rice of claim 11, comprising treating the germinated brown rice with hot water by immersing the germinated brown rice in hot water of 60° C. to 100° C. for 5 to 30 minutes.

* * * * *